United States Patent

[11] 3,560,711

| | | |
|---|---|---|
| [72] | Inventor | Siegfried E. Manecke<br>Indiana, Pa. |
| [21] | Appl. No. | 520,421 |
| [22] | Filed | Jan. 13, 1966 |
| [45] | Patented | Feb. 2, 1971 |
| [73] | Assignee | Robertshaw Controls Company<br>Richmond, Va.<br>a corporation of Delaware |

[54] OVEN CONTROL SYSTEM AND PARTS THEREFOR OR THE LIKE
11 Claims, 4 Drawing Figs.

[52] U.S. Cl. ..................................... 219/413, 219/398
[51] Int. Cl. ..................................... F27d 11/02
[50] Field of Search .......................... 219/413, 393—398

[56] References Cited
UNITED STATES PATENTS

| | | | |
|---|---|---|---|
| 3,032,636 | 5/1962 | Schaver, Jr. .................. | 219/413(X) |
| 3,093,722 | 6/1963 | Schaver, Jr. .................. | 219/413(X) |
| 3,353,004 | 11/1967 | Alexander .................... | 219/393(X) |
| 2,224,983 | 12/1940 | Parkhurst .................... | 219/413 |
| 2,201,584 | 5/1940 | Kahn et al. ................... | 219/413(X) |
| 2,806,120 | 9/1957 | Deas, Jr. ...................... | 219/413(X) |

*Primary Examiner*—Volodymyr Y. Mayewsky
*Assistant Examiner*—Hiram B. Gibson
*Attorneys*—Auzville Jackson, Jr., Robert L. Marben and Candor Candor & Tassone

ABSTRACT: An oven control system wherein a first control means is adapted to interconnect a source of high input energy to the heating means of the oven to produce a first temperature effect of the heating means in the oven and a second control means is adapted to interconnect a source of low input energy to the heating means to produce a second temperature effect of the heating means when the first control means has been moved to a "keep warm" position whereby the low input energy maintains the oven at a noncooking and warmth retaining temperature within a narrow temperature differential range.

INVENTOR.
SIEFRIED E. MANECKE
BY
Cauden & Cauden
HIS ATTORNEYS

INVENTOR.
SIEGFRIED E. MANECKE
BY Cauden & Cauden
HIS ATTORNEYS 3,560,711

OVEN CONTROL SYSTEM AND PARTS THEREFOR OR THE LIKE

This invention relates to an improved oven control system as well as to improved parts for such a control system or the like. In addition, this invention relates to an improved method for operating an oven or the like.

It is well-known that various manufacturers have provided a domestic cooking oven with a control means for operating the heater means thereof in such a manner that the housewife or the like can place food, such as a roast or the like, in the oven and set the thermostatic control at the desired cooking temperature whereby the oven will automatically cook the food at the set temperature and, thereafter, will automatically reduce the temperature in the oven to a lower noncooking and warmth retaining temperature for an indefinite period of time after the occurence of an event, such as after the lapse of a predetermined high temperature cooking time or by the sensing of internal temperature by a meat probe. In this manner, the cooked food will be maintained at a palatable and serving temperature in the oven until the housewife returns or desires to serve the food whereby the housewife can prepare her meal ahead of time and have the actual serving time flexible without having the food overcooked.

Accordingly, it is a feature of this invention to provide an improved oven control system of the above type, the control system of this invention having the improved feature of interconnecting a source of high input energy to the heating means of the oven during the cooking operation thereof and interconnecting a source of low input energy to the heating means during the warmth retaining and noncooking operation of the oven whereby the lower temperature of the oven can be accurately maintained as the control system of this invention provides a very narrow temperature differential at the warmth retaining and noncooking temperature setting thereof.

In addition, the control system of this invention permits the housewife or the like to utilize the source of low input energy to heat the oven independently of a cooking operation for various purposes, such as a plate warming purpose or the like.

Accordingly, it is an object of this invention to provide an improved oven control system or the like having one or more of the novel features of this invention as set forth above or hereinafter shown or described.

Another object of this invention is to provide improved parts for such a control system or the like.

A further object of this invention is to provide an improved method for operating an oven or the like.

Other objects, uses and advantages of this invention are apparent from a reading of this description, which proceeds with reference to the accompanying drawings forming a part thereof and wherein.

Figure 1:
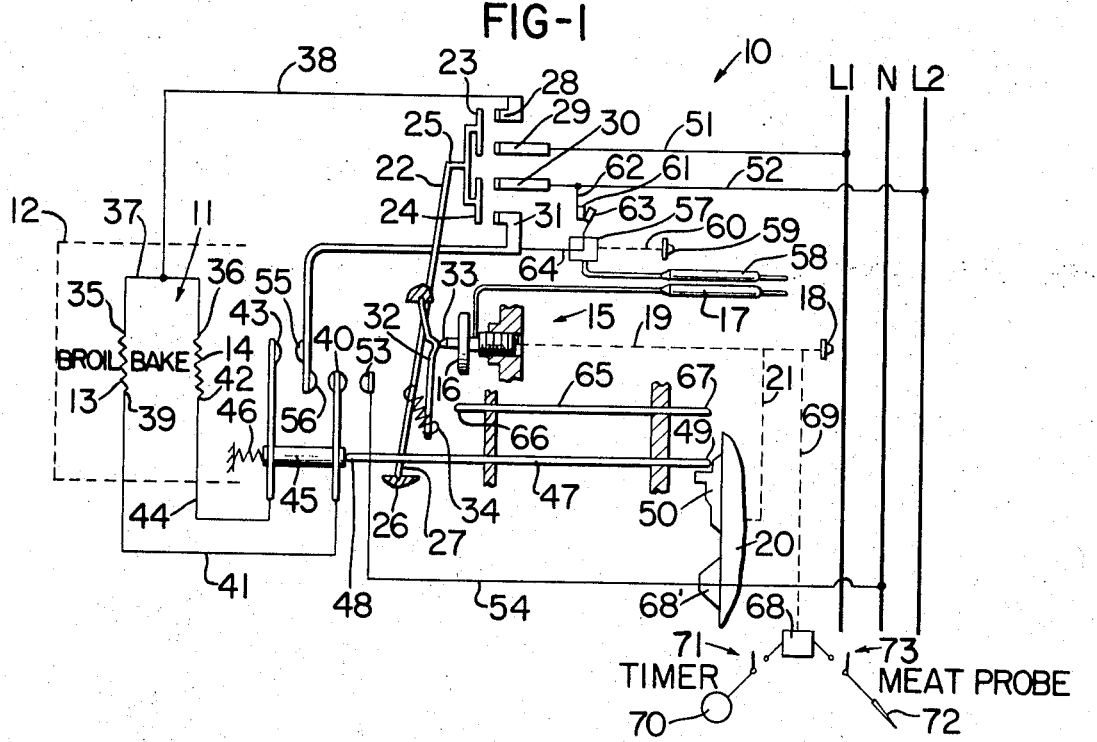
FIG. 1 is a schematic view illustrating the improved control system of this invention set in its "off" position.

While the various features of this invention are hereinafter described and illustrated as being particularly adaptable for controlling the operation of a domestic cooking oven or the like, it is to be understood that the various features of this invention can be utilized singly or in any combination thereof to provide a control system and parts therefor for other devices as desired.

Therefore, this invention is not to be limited to only the embodiment illustrated in the drawings, because the drawings are merely utilized to illustrate one of the wide variety of uses of this invention.

Referring now to FIG. 1, the improved oven control system of this invention is generally indicated by the reference numeral 10 and provides means for controlling the heating operation of a heating means 11 disposed in a suitable cooking oven 12, the heating means 11 including an electrical heating element 13 arranged in the oven 12 for broiling purposes and an electrical heating element 14 arranged in the oven 12 for baking purposes.

The normal operation of the heating means 11 is controlled by a switching means generally indicated by the reference numeral 15 and fully disclosed and claimed in the U.S. Pat. to Wantz et al., No. 2,943,177, issued June 28, 1969, and entitled "Thermostatic Switch."

Figure 2:
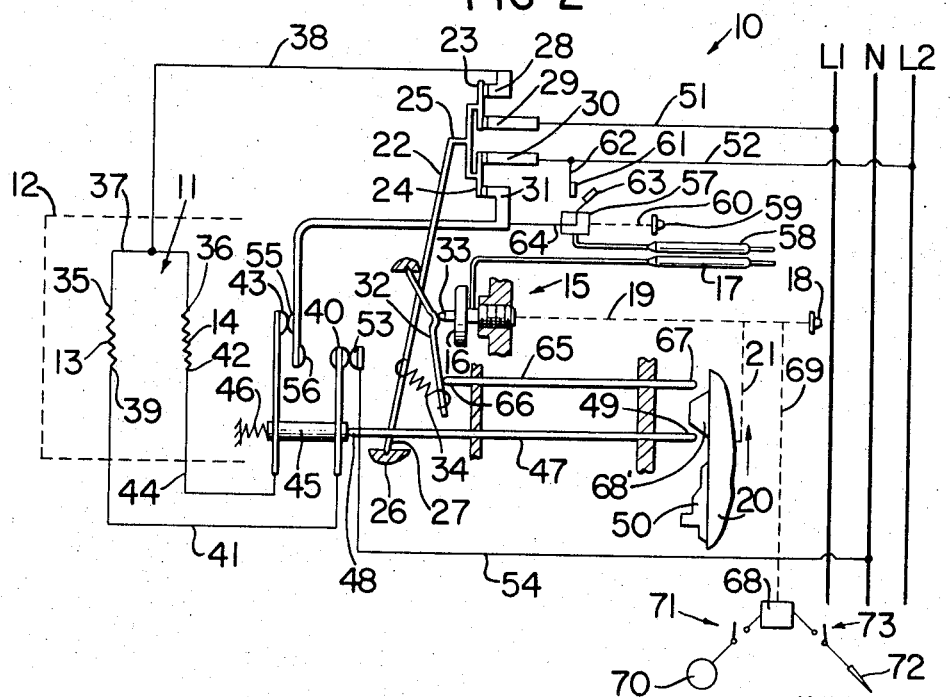
FIG. 2 is a view similar to FIG. 1 and illustrates the control system set in its "bake" position.
Figure 3:
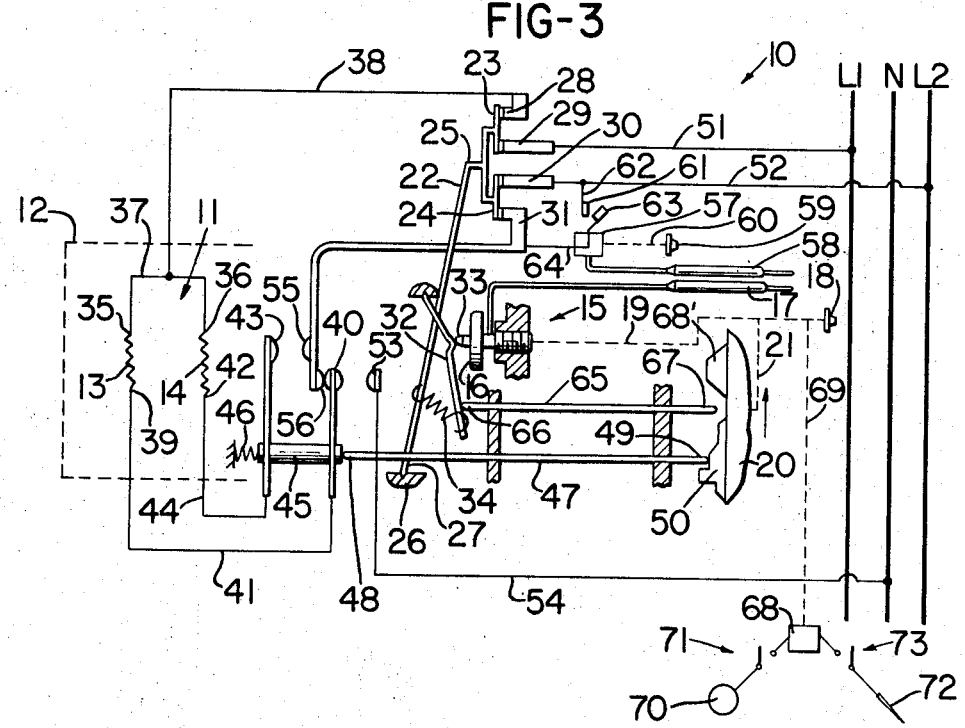
FIG. 3 is a view similar to FIG. 1 and illustrates the control system set in its "broil" position.

Therefore, reference is hereby made to the above-mentioned U.S. Patent for the structural details and operation of the switching means 15 for controlling the operation of the heating means 11 during the sequence of operation thereof as illustrated in FIGS. 1—3.

Figure 4:
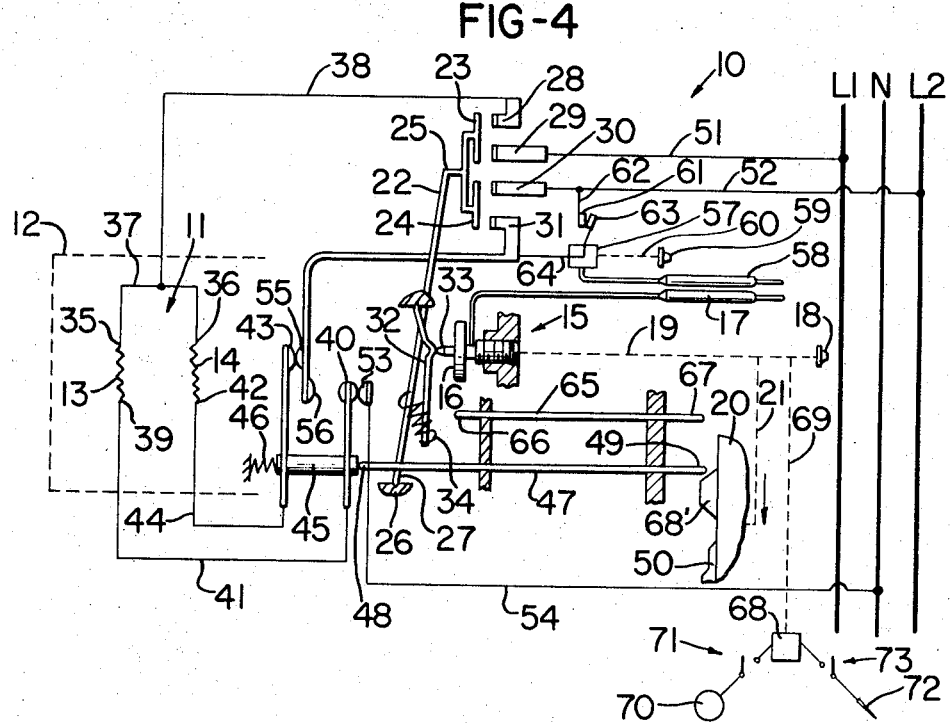
FIG. 4 is a view similar to FIG. 1 and illustrates the control system set in its "keep warm" position.

However, sufficient details of the switching means 15 will now be described in order to fully understand the improvements made thereto by this invention to produce the "keep warm" setting of the system 10 as illustrated in FIG. 4 and more fully described hereinafter.

As illustrated in FIG. 1, the switching means 15 includes an adjustable thermostat 16 comprising an expansible and contractible element having the chamber thereof interconnected to a temperature sensing bulb 17 disposed in the oven 12 for sensing the temperature thereof.

The setting of the thermostat 16 is controlled by a manually operated selector knob 18 suitably interconnected to the thermostat 16 by means 19 and to a camming means 20 by means 21, such interconnection of the knob 18 to the thermostat 16 and camming means 20 being fully disclosed in the aforementioned U.S. Pat.

A lever or arm 22 is provided and has a pair of electrical contacts 23 and 24 at one end 25 thereof and is fulcrumed to a suitable frame means 26 at the other end 27 thereof. The contact 23 is cooperable with a pair of separate stationary electrical contacts 28 and 29 while the contact 24 of the lever 22 is cooperable with a pair of stationary electrical contacts 30 and 31.

The lever 22 is moved between its opened and closed positions as illustrated respectively in FIGS. 1 and 2 by a snap spring arrangement comprising a fulcrumed lever or arm 32 engageable with the end 33 of the thermostat 16 and interconnected to the lever 22 by snap spring means 34.

One side 35 of the broil element 13 is interconnected to one side 36 of the bake element 14 by a lead 37, the lead 37 being, in turn, interconnected to the fixed contact 28 by a lead 38. The other side 39 of the broil element 13 is interconnected to a movable contact 40 by a lead 41. The other side 42 of the bake element 14 is interconnected to a movable contact 43 by a lead 44.

The movable contacts 40 and 43 are interconnected together to move in unison by an insulated rod means 45, the insulated rod means 45 being normally biased to move to the right in the drawings by a compression spring 46 or the like. However, movement of the movable contacts 40 and 43 is controlled by an adjustable rod 47 having an end 48 engageable with the insulated rod 45 and an opposed end 49 engageable by a cam element 50 of the cam means 20.

An electrical power source of the three wire type is provided, such as a 120/240 volt alternating current source, and comprises two power lines $L^1$ and $L^2$ and a neutral or common line N. The power line $L^1$ is interconnected to the fixed contact 29 by a lead 51. The other power line $L^2$ is interconnected to the contact 30 by a lead 52. The third line N of the electrical power source is interconnected to a fixed contact 53 by a lead 54, the contact 53 being cooperable with the movable contact 40 in a manner hereinafter described.

The fixed contact 31 carries and is electrically interconnected to a pair of fixed contacts 55 and 56 respectively cooperable with the movable contacts 43 and 40 for a purpose hereinafter described.

A low temperature thermostatic means 57 is provided and has a power element (not shown) having the chamber thereof interconnected to a temperature sensing bulb 58 disposed in the oven 12 to sense the temperature thereof, the thermostatic element 57 being adapted to manually set in a low temperature range, such as between 165° F. to 225° F., by a control knob 59 interconnected to the thermostatic means 57 by means 60.

The thermostatic means 57 has a fixed electrical contact 61 interconnected to the lead 52 by a lead 62 and a cooperable and movable contact 63 interconnected to the contacts 31, 55 and 56 by a lead 64.

The thermostatic element 57 is adapted to open and maintain the contact 63 in an open position relative to the fixed contact 61 as long as the temperature of the oven 12 is above the temperature selected by the control knob 59. Conversely, when the temperature of the oven 12 falls below the temperature set by the control knob 59, the thermostatic element 57 closes the contact 63 against the contact 61 and holds the same in their closed positions until the temperature of the oven 12 reaches or exceeds the temperature set by the control knob 59 for a purpose hereinafter described.

Another actuating rod 65 is provided and has one end 66 adapted to engage the lever 32 of the switch means 15 and has an opposed end 67 engageable by another cam 68 on the cam means 20 controlled by the control knob 18, the purpose of the rod 65 being fully set forth in the aforementioned U.S. Patent so that when the control knob 18 is moved from the end of its bake range position to its broil position, the cam 68 will move the rod 65 to the left to hold the lever 32 substantially in the position illustrated in FIG. 1 whereby the movable contacts 23 and 24 of the lever or arm 22 are held out of electrical contact with the contacts 28, 29 and 30, 31 until the control knob 18 is set in the broil position thereof whereby the rod 65 is permitted to move back to the right and permit the lever 22 to assume the position illustrated in FIG. 3 for broiling purposes.

If desired, a suitable means 68 can be provided for automatically turning the control knob 18 to its "keep warm" position as illustrated in FIG. 4 for a purpose hereinafter described even though the control knob 18 had been previously set in any of its high temperature cooking positions, the knob turning means 68 being interconnected thereto by means 69 which are well known in the art. The control knob turning means 68 can be activated to turn the control knob 18 to its "keep warm" position by manually activating the device 68 or by automatically actuating the device 68 after the occurrence of an event.

For example, a suitable timer 70 can be provided and can be electrically interconnected to the actuator 68 by selectively operable switch means 71 so that the timer 70 can be set to activate the actuator 68 after a preselected length of time has lapsed. Similarly, a meat probe 72 can be provided to be electrically interconnected to the actuator 68 by suitable switch means 73, such as a plug-in connection, to activate the actuator 68 after the meat probe 72 has determined that the internal temperature of the food receiving the same has reached the selected temperature.

In this manner, the housewife or the like can place food in the oven 12 and set the control knob 18 at the desired cooking temperature and by either the timer 70 or the meat probe 72 have the control knob 18 automatically turn to its "keep warm" temperature when the actuator 68 is activated by either a lapse of time selected by the timer 70 or by the meat probe 72 sensing a desired degree of doneness of the cooked food receiving the probe 72 whereby the system 10 of this invention in its "keep warm" position of FIG. 4 will maintain the food in the oven 12 at a warmth retaining but substantially noncooking temperature for a relatively long period of time so that when the housewife or the like desires, the system 10 can be turned off in a manner hereinafter described and the food removed for serving purposes without having the same overcooked.

The operation and method of the oven control system 10 of this invention will now be described.

Referring now to FIG. 1, the control system 10 of this invention is disposed in its off position whereby when the control knob 18 is set in its "off" position, the thermostatic element 16 has been adjusted to the position illustrated in FIG. 1 against the lever 32 to hold the lever 22 in the position illustrated in FIG. 1 wherein the contacts 23 and 24 of the lever 22 are positively held out of electrical contact with the contacts 28, 29 and 30, 31. In addition, when the control knob 18 is in its "off" position as illustrated in FIG. 1, the cam 50 holds the rod 47 in the position illustrated in FIG. 1 to positively maintain the movable contacts 40 and 43 respectively out of electrical contact with the contacts 53, 56 and 55 whereby electrical current cannot possibly be supplied to the heater means 11.

When the operator, such as the housewife or the like, rotates or sets the control knob 18 in any of its "bake" range positions, the system 10 will assume the position illustrated in FIG. 2 whereby the thermostatic element 16 has been adjusted to the right to permit the spring means 34 to pivot the lever 22 in a clockwise direction and place the contacts 23 and 24 thereof respectively into electrical contact with the contacts 28, 29 and 30, 31 while the adjusted cam means 20 has moved the cam 50 away from the rod 47 so that the spring means 46 can move the movable contacts 40 and 43 into electrical contact with the contacts 53 and 55 as illustrated in FIG. 2.

With the system 10 now disposed in the position illustrated in FIG. 2, it can be seen that the bake element 14 is placed across the power lines $L^1$ and $L^2$ to receive high input energy whereby the bake element 14 is supplied electrical current having approximately 240 volts for a high input energy source. In particular, the power source provided by the lines $L^1$ and $L^2$ can comprise a 120/240 volt alternating current source. In addition, with the system 10 disposed in the "bake" position of FIG. 2, the broil element 13 is supplied with a source of low input energy which, in the embodiment illustrated, comprises a current having approximately 120 volts.

For example, the line $L^1$ is interconnected to the side 36 of the bake element 14 by means of lead 51, contact 29, contact 23, contact 28, lead 38 and lead 37. The other side 42 of the bake element 14 is interconnected to the power lead or line $L^2$ by the lead 44, contact 43, contact 55, contact 31, contact 24, contact 30 and lead 52.

The broil element 13 is placed across the power line $L^1$ and neutral line N in the following manner so that the broil element 13 is supplied with a source of low input energy during a baking operation of the oven 12.

In particular, the power line $L^1$ is interconnected to the side 35 of the broil element 13 by the lead 51, contact 29, contact 23, contact 28, lead 38 and lead 37. The other side 39 of the broil element 13 is interconnected to the neutral line N by lead 31, contact 40, contact 53 and lead 54.

Thus, the system 10 remains in the position illustrated in FIG. 2 to supply a source of high input energy to the bake element 14 and a source of low input energy to the broil element 13 to heat the oven 12 for a cooking purpose thereof. However, when the thermostatic means 16 senses that the temperature of the oven 12 has exceeded the cooking temperature set by the control knob 18, the power element of the thermostatic means 16 has the end 33 thereof moved to the left a distance sufficient to cause the lever 32 to snap the lever 22 in a counterclockwise direction to prevent the contacts 23 and 24 from respectively bridging the contacts 28, 29 and 30, 31 to terminate the flow of energy to the heater means 11 until the temperature of the oven 12 again falls below the selected temperature, at this time, the thermostatic means 16 again permits the lever 22 to move back to the position illustrated in FIG. 2 to again supply electrical current to the heater means 11. In this manner, it can be seen that the thermostatic means 16 maintains the temperature of the oven 12 at the temperature selected by the control knob 18 by cycling the flow of electrical current to the heating means 11 whereby the food or the like placed in the oven 12 will be cooked at the selected temperature.

During the operation of the system 10 in its "bake" position illustrated in FIG. 2, it can be seen that the thermostatic means 57 maintains the movable contact 63 out of electrical contact with the contact 61 as the temperature bulb 58 thereof is sensing a temperature in the oven 12 higher than the temperature set by the control knob 59 thereof.

However, should the actuator 68 be subsequently actuated by the timer motor 70, the meat probe 72 or manually as desired, the activated actuator 68 will automatically turn or set the control knob 18 in its "keep warm" position as illustrated in FIG. 4 wherein the thermostatic element 16 is adjusted to a position to positively maintain the lever 22 in a counterclockwise position so that the contacts 23 and 24 thereof will not bridge the contacts 28, 29 and 30, 31 whereby the source of energy cannot be supplied to the heating means 11 through the contacts 23 and 24. With the control knob 18 set in the "keep warm" position illustrated in FIG. 4, the rod 47 is still maintained to the right by the spring means 46 whereby the movable contact 43 remains in electrical contact with the contact 55 and the movable contact 40 remains in electrical contact with the contact 53 whereby the thermostatic means 57 is adapted to interconnect a source of low input energy to the heater means 11 to maintain the temperature of the oven 12 at a warmth retaining the substantially noncooking temperature indefinitely until the system 10 is turned off the to the position illustrated in FIG. 1, the warmth retaining and substantially noncooking temperature of the oven 12 having been preselected by the setting of the control knob 59.

In particular, when the temperature of the oven 12 reaches or falls below the temperature set by the control knob 59 when the system is in the "keep warm" position of FIG. 4, it can be seen that the thermostatic means 57 closes the contact 63 against the contact 61 whereby both the bake element 14 and the broil element 13 are placed in series across the power line L² and neutral line N so that the same will be supplied a source of low input energy. Because the low temperature of the oven 12 is being supplied by a source of low input energy, it is possible to obtain a very narrow temperature differential during the "keep warm" setting of the system 10 of this invention.

In particular, with the contact 63 placed in electrical contact with the contact 61 by the thermostatic means 57, the power line L¹ is connected by lead 52, lead 62, contact 61, contact 63, lead 64, contact 55, contact 43 and lead 44 to the side 42 of the bake element 14 and back to the neutral line N by means of the bake element 14, lead 37, broil element 13, lead 41, contact 40, contact 53 and lead 54 whereby the source of low input energy being supplied to the heating means 11 heats up the oven 12 back to the temperature set by the control knob 59. Should the temperature of the oven 12 again reach or exceed the set "keep warm" temperature of the control knob 59, the thermostatic element 57 moves the contact 63 away from the contact 61 to terminate the flow of current to the heating means 11 until the temperature again falls to or below the selected temperature whereby the thermostat 57 is adapted to cycle on and off the heating means 11 to tend to maintain the oven 12 at the temperature selected by the knob 59.

When the control knob 18 is in its "keep warm" position, the temperature setting of the knob 18 is approximately 150° F. and, therefore, completely below the lowest setting of the "keep warm" knob 59 whereby the thermostatic element 16 will never cause the lever 22 to place the contacts 23 and 24 into electrical contact with the contacts 28, 29 and 30, 31 during a "keep warm" operation of the system 10.

While the operation of the system 10 has been previously described in connection with FIG. 4 after the actuator 68 has returned the control knob 18 from a high temperature setting thereof to its "keep warm" setting, it is to be understood that the system 10 can be turned from its "off" position of FIG. 1 directly to the "keep warm" condition of FIG. 4, if desired, for a "keep warm" operation of the oven 12, such as for dinner plate warming and the like.

In particular, with the knob 58 set at the desired "keep warm" temperature or moved to the desired "keep warm" temperature, the operator can turn the control knob 18 from its "off" position to FIG. 1 directly to its "keep warm" position of FIG. 4 whereby the system 10 of this invention will maintain the temperature of the oven 12 at the set "keep warm" temperature of the knob 59 in the manner previously described by cycling as the source of low input energy to the heater means 11 by means of the opening and closing of the contacts 61 and 63 under the influence of the thermostatic means 57 in the manner previously described.

When it is desired to set the system 10 of this invention in its "broil" position of FIG. 3, it can be seen that when the control knob 18 is rotated or set in its "broil" position, the thermostat unit 16 permits the lever 22 to move to its clockwise position and have the contacts 23 and 24 thereof respectively bridge the contacts 28, 29 and 30, 31 while the cam 50 of the cam means 20 is so moved that the rod 47 causes the contact 40 to be placed into electrical contact with the contact 56 so that only the source of high input energy will be supplied to the broil element 13.

In particular, when the control system 10 of this invention is set in its "broil" position of FIG. 3 and the thermostatic unit 16 is permitting the contacts 23 and 24 to bridge the contacts 28, 29, and 30, 31 because the temperature sensing bulb 13 senses a temperature in the oven 12 below the temperature selected by the knob 18 at its "broil" position, the line L¹ is interconnected to the side 35 of the broil element 13 by the lead 51, contact 59, contact 23, contact 28, lead 38 and lead 37 while the other side 39 of the broil element 13 is interconnected to the power line L² by the lead 41, contact 40, contact 56, contact 31, contact 24, contact 30 and lead 52 whereby the broil element 13 receives electrical current having the aforementioned 240 volts. Should the temperature of the oven 12 exceed the temperature setting of the thermostat 16 at the "broil" position of the knob 18, the thermostat 16 opens the contacts 23 and 24 relative to the fixed contacts 28, 29 and 30, 31 to terminate the flow of current to the broil element 13 until the temperature of the oven 12 again falls below the "broil" temperature thereof whereby the thermostat unit 16 again permits the lever 22 to interconnect the source of high input energy to the burner means 11. Thus, the thermostat means 16 is adapted to cycle the broil element 13 on and off to maintain the oven 12 at the broil temperature setting thereof.

Even with the system 10 set in its "broil" position of FIG. 3, it can be seen that the control knob 18 can, thereafter, be set into its "keep warm" position of FIG. 4 either by actuation of the previously described actuator 68 or by the control knob 18 being manually turned to its "keep warm" position of FIG. 4 whereby the thermostatic means 57 will maintain the temperature of the oven 12 at its "keep warm" temperature set by the knob 59 in the manner previously described by supplying a source of low input energy to the heating means 11 whereby the "keep warm" temperature of the oven 12 can be maintained with a very narrow temperature differential during the "keep warm" operation of the system 10.

Accordingly, it can be seen that not only does this invention provide an improved control system for a cooking oven or the like as well as an improved method for operating such a cooking oven or the like, but also this invention provides improved parts for such a system or the like.

I claim:

1. In combination, a cooking oven, electrical heating means for said oven, a first source of high input electrical energy, a first electrical control means having a first selector means and a first thermostatically operated switch selectively set by said first selector means, said first control means having a selector switch selectively set by said first selector means, said first control means being operatively interconnected to said heating means and to said first source for interconnecting said first source to said heating means through said selector switch when said first selector means of said first control means is in one position thereof to produce a first temperature effect of said heating means in said oven, a second source of low input electrical energy, and a second electrical control means having a second selector means and a second thermostatically operated switch selectively set by said second selector switch, said second control means being operatively interconnected to said heating means and to said second source for interconnecting only said second source to said heating means through said selector switch only when said first selector means of said first control means is in another position thereof and said second selector means of said second control means in is in one position thereof to produce a second temperature effect of said heating means in said oven.

2. A combination as set forth in claim 1 wherein said heating means comprises electrical heating means, said first source comprises an approximate 240 volt alternating electrical current source and said second source comprises an approximate 120 volt alternating electrical current source.

3. A combination as set forth in claim 2 wherein an electrical power source of two power leads and a neutral lead is provided, said first source comprising said two power leads, said second source comprising one of said power leads and said neutral lead.

4. A combination as set forth in claim 1 wherein said first control means comprises a selector means for thermostatically controlling said heating means to maintain the temperature in said oven at a temperature selected by said selector means.

5. A combination as set forth in claim 1 wherein said second control means comprises a selector means for thermostatically controlling said heating means to maintain the temperature in said oven at a temperature selected by said selector means.

6. A combination as set forth in claim 1 wherein said heating means comprises an oven bake element and an oven broil element.

7. A combination as set forth in claim 6 wherein said selector switch interconnects said first source to said bake element and said second source to said broil element when said first selector means is set in a "bake" position thereof.

8. A combination as set forth in claim 7 wherein said selector switch interconnects only said first source to said broil element when said first selector means is set in a "broil" position thereof.

9. A combination as set forth in claim 8 wherein said selector switch interconnects said second source to said bake element and to said broil element only when said first selector means is set in a "keep warm" position thereof.

10. A combination as set forth in claim 9 wherein means are provided for automatically moving said first selector means to said "keep warm" position thereof after said first selector means has been set in another position thereof and after the occurrence of an event.

11. In combination, a first selectively operable control means for interconnecting a first source of high input energy to a heating means of an oven to produce a first temperature effect in said oven, a second selectively operable control means for interconnecting a second source of low input energy to said heating means to produce a second temperature effect in said oven, said first control means being adapted to interconnect said first source to a bake element of said heating means and to interconnect said second source to a broil element of said heating means when said first control means is set in a "bake" position thereof, said first control means only being adapted to interconnect said first source to said broil element when said first control means is set in a "broil" position thereof, said second control means being adapted to interconnect said second source to said bake element and said broil element when said first control means is set in a "keep warm" position thereof, and means for automatically moving said first control means to said "keep warm" position thereof after said first control means has been set in another position thereof and after the occurrence of an event, said first control means including a thermostatically operated lever carrying a first contact and a second contact, said first control means including stationary third, fourth, fifth and sixth contacts with said third and fourth contacts being arranged to be bridged by said first contact and with said fifth and sixth contacts being arranged to be bridged by said second contact, said third contact being adapted to be interconnected to one end of said bake element and to one end of said broil element, said fourth contact and said fifth contact being adapted to be respectively interconnected to two power leads of a three wire electrical power source, said first control means including a pair of seventh and eighth contacts respectively being adapted to be interconnected to the other end of said bake element and to the other end of said broil element and being arranged to be movable in unison, said first control means including a pair of ninth and tenth stationary contacts respectively being cooperable with said seventh contact and said eighth contact and being interconnected to said sixth contact, said control means including an eleventh stationary contact adapted to be interconnected to a neutral lead of said three wire power source, said second control means having means to interconnect said fifth contact with said ninth contact, said first control means thermostatically controlling the opening and closing of said first and second contacts with said third and fourth contacts and said fifth and sixth contacts while holding said seventh and eighth contacts respectively against said ninth and eleventh contacts when said first control means is set in said "bake" position thereof, said first control means thermostatically controlling the opening and closing of said first and second contacts with said third and fourth contacts and said fifth and sixth contacts while holding said tenth contact against said eighth contact when said first control means is set in said "broil" position thereof, said first control means holding said first and second contacts away from said third, fourth, fifth and sixth contacts while holding said seventh and eighth contacts respectively against said ninth and tenth contacts when said first control means is set in its "keep warm" position whereby said second control means thermostatically controls the interconnection between said fifth contact and said ninth contact, said first control means holding said first and second contacts away from said third, fourth, fifth and sixth contacts while holding said seventh and eighth contacts away from all of their cooperable contacts when said first control means is set in its "off" position whereby no current is supplied to said heating means.